United States Patent
Pachner et al.

(10) Patent No.: US 10,125,817 B2
(45) Date of Patent: Nov. 13, 2018

(54) PLAIN BEARING ARRANGEMENT FOR A SHAFT LOADED WITH A CIRCUMFERENTIAL RADIAL FORCE

(71) Applicant: Schaeffler Technologies AG & Co. KG, Herzogenaurach (DE)

(72) Inventors: Sebastian Pachner, Bamberg (DE); Michael Plogmann, Herzogenaurach (DE); Wolfram Kruhoffer, Aurachtal (DE); Sven Claus, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/545,473

(22) PCT Filed: Jan. 22, 2016

(86) PCT No.: PCT/DE2016/200029
§ 371 (c)(1),
(2) Date: Jul. 21, 2017

(87) PCT Pub. No.: WO2016/119787
PCT Pub. Date: Aug. 4, 2016

(65) Prior Publication Data
US 2018/0010636 A1  Jan. 11, 2018

(30) Foreign Application Priority Data
Jan. 26, 2015 (DE) .......................... 10 2015 201 251

(51) Int. Cl.
*F16C 33/10* (2006.01)
*F16C 17/10* (2006.01)
(Continued)

(52) U.S. Cl.
CPC .......... *F16C 33/1065* (2013.01); *F16C 17/10* (2013.01); *F16C 33/103* (2013.01);
(Continued)

(58) Field of Classification Search
CPC ........ F16C 17/10; F16C 25/02; F16C 33/103; F16C 33/106; F16C 33/1045;
(Continued)

(56) References Cited

U.S. PATENT DOCUMENTS

| 1,986,040 A | * | 1/1935 | Buhler | F16C 33/10 384/409 |
| 2,719,064 A | * | 9/1955 | Barnard | F16C 25/04 384/218 |

(Continued)

FOREIGN PATENT DOCUMENTS

| DE | 2837938 | 3/1980 | |
| DE | 102007018794 A1 | * 10/2008 | F16C 23/04 |

(Continued)

*Primary Examiner* — Marcus Charles
(74) *Attorney, Agent, or Firm* — Volpe and Koenig, P.C.

(57) ABSTRACT

A plain bearing arrangement for a shaft loaded with a circumferential radial force, having a bearing ring arranged in a rotationally fixed manner in a housing component and having a first running surface formed on the inner circumference, and a second running surface formed on the outer circumference of the shaft or on the outer circumference of a sleeve arranged on the shaft, the second running surface being mounted in a sliding manner on the first running surface, wherein a device for axially feeding a lubricant to an end side of the shaft is provided, and at least one axially extending, radially open groove that is axially open in a direction of the end side of the shaft is formed in the second running surface.

10 Claims, 5 Drawing Sheets

(51) Int. Cl.
*F16C 33/60* (2006.01)
*B61F 15/02* (2006.01)
*F16C 35/02* (2006.01)
*F16C 33/66* (2006.01)
*F16C 27/02* (2006.01)
*F16C 17/02* (2006.01)
*F16C 23/04* (2006.01)

(52) U.S. Cl.
CPC .......... *F16C 33/1055* (2013.01); *F16C 35/02* (2013.01); *B61F 15/02* (2013.01); *F16C 17/02* (2013.01); *F16C 23/04* (2013.01); *F16C 27/02* (2013.01); *F16C 33/6607* (2013.01); *F16C 2240/42* (2013.01); *F16C 2300/02* (2013.01)

(58) Field of Classification Search
CPC .............. F16C 33/1055; F16C 33/1065; F16C 33/6607; B61F 15/02; B61F 17/00; F16N 29/02; F16N 7/14
USPC ....... 384/160, 291, 316, 322, 376, 389, 401, 384/438, 440
See application file for complete search history.

(56) References Cited

U.S. PATENT DOCUMENTS

| | | | |
|---|---|---|---|
| 3,211,501 A * | 10/1965 | Clark | B61F 15/02 384/161 |
| 3,450,056 A * | 6/1969 | Stark | F04D 13/0613 310/86 |
| 3,736,705 A * | 6/1973 | Ryan | B24B 41/04 384/303 |
| 3,859,885 A * | 1/1975 | Hayashida | F16C 23/04 384/300 |
| 4,251,182 A * | 2/1981 | Schroeder | B62D 55/0887 384/276 |
| 4,392,751 A * | 7/1983 | Ida | F16C 32/067 384/114 |
| 4,558,960 A | 12/1985 | Lehtinen et al. | |
| 4,605,363 A * | 8/1986 | Walsh | F01C 21/02 384/192 |
| 5,013,947 A | 5/1991 | Ide | |
| 5,669,718 A * | 9/1997 | Sakairi | B62D 1/16 384/215 |
| 5,853,260 A * | 12/1998 | Curbillon | F16C 11/06 384/192 |
| 6,695,480 B1 * | 2/2004 | Ramsay | F04D 29/047 384/110 |
| 7,309,186 B2 * | 12/2007 | Oertley | E02F 3/283 172/810 |
| 7,766,433 B2 * | 8/2010 | Mulligan | B62D 55/0887 305/103 |
| 8,628,247 B2 * | 1/2014 | Uesugi | F01D 25/166 384/397 |
| 8,821,022 B2 * | 9/2014 | Akita | B22F 3/1146 384/279 |
| 2011/0067509 A1 | 3/2011 | Kleibl et al. | |
| 2012/0070280 A1* | 3/2012 | Wadehn | F03D 7/0212 416/1 |
| 2014/0254963 A1 | 9/2014 | Blair et al. | |
| 2014/0254966 A1 | 9/2014 | Zhou et al. | |

FOREIGN PATENT DOCUMENTS

| | | | |
|---|---|---|---|
| EP | 0158242 | 3/1985 | |
| EP | 2150713 | 12/2011 | |
| GB | 789118 A * | 1/1958 | ............... B61F 15/16 |
| GB | 1005883 A * | 9/1965 | ............... F16N 7/18 |
| JP | H06173954 | 6/1994 | |

* cited by examiner

PLAIN BEARING ARRANGEMENT FOR A SHAFT LOADED WITH A CIRCUMFERENTIAL RADIAL FORCE

INCORPORATION BY REFERENCE

The following documents are incorporated by reference as if fully set forth herein: PCT/DE2016/200029, filed Jan. 22, 2016, and German Patent Application 10 2015 201 251.4, filed Jan. 26, 2015.

BACKGROUND

The invention relates to a plain bearing arrangement for a shaft loaded with a circumferential radial force, comprising a bearing ring arranged locked in rotation in a housing component with a first running surface formed on the inner circumference and a second running surface formed on the outer circumference of the shaft or on the outer circumference of a sleeve arranged on the shaft and is supported so that it can slide on the first running surface.

If a rotating shaft is loaded with a circumferential radial force that is not parallel, preferably perpendicular, to the rotational axis, this necessarily causes shaft deformation or shaft bending. The deformation or bending depends on the change in direction and size of the applied radial force. Due to the circumferential radial force, it necessarily produces a circumferential deformation or bending. Typically, such a system generates certain vibrations, i.e., such a system can be used in so-called vibration machines, for example, separators or shakers or other oscillation exciters or vibrators. These applications represent high demands on the shaft support, especially with respect to load bearing capacity, equalization of shaft bending, insensitivity to oscillation or interference, and noise behavior.

In addition to roller bearings, plain bearings are also provided for supporting the shaft, because a plain bearing has good damping properties, which is why they are often used for dynamic loads. A plain bearing arrangement of the type in question is known, for example, from EP 2 150 713 B1.

A prerequisite for good damping and stiffness properties of the plain bearing or such a plain bearing arrangement is the supply of the bearing or lubricating gap with a sufficient amount of lubricant, typically oil. In the system known from EP 2 150 713 B1, the lubricant supply to the sliding area is realized via a lubricant channel extending axially through the shaft, with at least one radial channel branching off from this lubricant channel to the running surface area. The lubricant must be fed to the shaft end with pressure, e.g., a corresponding rotational feedthrough must be provided to be able to introduce the lubricant into the rotating shaft. The lubricant supply is realized basically from the inside out via the shaft itself. This is complicated because, on one hand, the shaft must be provided with corresponding channels and, on the other hand, a corresponding rotational feedthrough must be provided.

SUMMARY

The invention is thus based on the object of providing a plain bearing arrangement that has a simpler construction and enables a good lubricant supply to the bearing gap.

To achieve this objective, in a plain bearing arrangement of the type specified above, it is provided that a device is provided for the axial supply of a lubricant to an end side of the shaft and that, in the second running surface, at least one groove is formed that is axially open in the direction of the end side of the shaft and extends axially and is radially open.

In the plain bearing arrangement according to the invention, the lubricant is fed to the shaft end side or is present there. The shaft itself or, if provided, the sleeve sitting locked in rotation on the shaft, is provided with at least one corresponding radially open groove, called "radial groove" below, which is open toward the shaft end side viewed axially. In the opposite direction, the radial groove is preferably, but not necessarily, closed. The lubricant present at the shaft end side now reaches into the axially open radial groove. By the use of this arrangement, the lubricant is carried along due to the rotation of the shaft and transported into the bearing gap that is then supplied accordingly by the lubricant. In other words, the lubricant adheres to the stationary bearing ring, while the shaft rotates. The lubricant is thus automatically fed to the narrowest lubricating gap. The radial groove does not necessarily have to be closed axially. It can also run to the other end, especially with reduced cross section or under formation of a dirt groove section.

The plain bearing arrangement according to the invention has a very simple construction and enables an efficient lubricant supply, especially without the use of rotational feedthroughs or a complex channel structure within the shaft. Instead, it is sufficient to ensure via the lubricant supply device that the lubricant is provided at sufficient pressure on the end side of the shaft, so that it can enter into the radial groove that is constructed as a simple radial recess and acts as a conveying groove and transports the lubricant into the lubricating gap. Any shaft-side channel is not provided.

In this construction, the at least one radial groove is formed directly on the shaft, namely when the shaft itself is supported directly in the bearing ring, consequently the shaft has the second running surface. To be able to avoid processing of the shaft for forming the radial groove, it is provided as one invention alternative to mount a corresponding sleeve on the shaft, wherein this mounting can be realized by a non-positive-locking, positive-locking, or material-bonding connection. This sleeve that rotates with the shaft and can be processed, as a relatively small component, in a significantly easier way than the shaft itself, in this case with the second running surface and the at least one radial groove.

The radial groove extends, viewed axially, preferably over at least half the second running surface. The longer it is, the more surface area the lubricant supply has in the bearing gap, viewed in the axial direction.

Preferably two radial grooves arranged offset circumferentially are provided. In other words, two circumferential lubricant reservoirs are formed on the shaft or the sleeve, so that the lubricant volume guided into the lubricant gap is larger accordingly.

Preferably the one or two radial grooves are arranged offset circumferentially relative to the radial load, i.e., they are formed on the shaft or sleeve offset circumferentially by a defined, constant angular increment relative to the radial load. This circumferential offset is preferred not to disrupt the pressure buildup in the hydrodynamic plain bearing. The offset in the construction with only one radial groove should be 45°-180° in the rotational direction (advancing) starting from the point where the force is applied, that is, the radial load. In other words, the radial groove can be constructed facing the radial load in a relatively large angular range up to the maximum. For two radial grooves, the offset of the grooves in the rotational direction should be 45°-180° and 210°-315° from the point where the force is applied or the radial load. Here, a relatively large angular increment is also given here to both sides of the radial load. In particular, for a device with changing rotational direction of the shaft, the construction of two radial grooves is naturally preferred, which are then arranged offset, preferably symmetrically, relative to the radial load.

The width and the depth of the radial groove can be constant from the open groove end to the closed groove end. Alternatively, it is conceivable that the width and/or the depth of the radial groove changes from the open groove end to the closed groove end. For example, the groove width can decrease, i.e., the radial groove becomes narrower and has a quasi-conical shape. Naturally, it could also expand toward the groove end. It could also be flatter or alternatively also deeper toward the closed groove end.

As described, the lubricant is fed so that it is present on the shaft on the axial or end side. A device used for this purpose can have, according to the invention, a cover arranged on the housing side, which overlaps the end side of the shaft and has at least one opening enabling lubricant to pass to the shaft and positioned adjacent to the end of the shaft. At this naturally position-fixed cover, for example, a lubricant line is connected, through which the lubricant is fed and flows through the opening to the end side. Any special rotational feedthroughs or other coupling elements are, as already described, advantageously not required.

Preferably, between the cover and the end side of the shaft and the bearing ring, optionally also the sleeve, there is an axial gap extending radially and used for collecting lubricant. The incoming lubricant flow collects this gap in which, however, the lubricant flowing out from the bearing gap to one side also collects. This is consequently fed to the bearing again, so that the entire necessary volume flow is significantly reduced.

On the cover opposite the end side of the shaft, an axial thrust washer can also be arranged, on which, in the case of an axial movement of the cover and shaft relative to each other, the shaft contacts.

As described, the circumferential radial load produced, for example, by an imbalance element mounted on the shaft causes shaft deformation or shaft deflection. This deflection is preferably taking into account by a corresponding construction in the plain bearing area, i.e., corresponding elasticity is provided on the bearing side, which enables elastic adaptation of the bearing ring to the shaft deformation. In this way, it is achieved that there is no twisting and the maximum bearing capacity of the plain bearing is achieved. In the plain bearing arrangement according to the invention, it is preferred to provide the bearing ring on one or two end sides with a circumferential axial groove, that is, an axial notch. In other words, the bearing ring that has a certain width, is recessed at one or both end sides with an axial groove, so that, in this plane, the ring width is reduced. Thus, if there are axial grooves on both sides, a connecting bar remains between the two grooves. Due to this notch or these notches, the bearing ring can follow the shaft bending, because an elastic relative movement of the running surface area is given relative to the opposite bearing ring area fixed on the housing component side.

The shaft or the sleeve can be provided preferably with a corresponding, wear-resistant hard material coating for forming a running layer that is harder relative to the bearing ring. Such a hard material layer could be, for example, a carbon layer, also often called a DLC layer (DLC=diamond like carbon). It can also be optionally doped with a metal, in this case, this would be a so-called Me-DLC layer, wherein, in particular, tungsten carbide (WC) is used as the dopant. Furthermore, the hard material layer could be a ceramic layer or a ceramic-like layer (e.g., nitride ceramic, oxide ceramic, or carbide ceramic, e.g., silicon nitride, silicon carbide, or nitrides or carbides of metals, such as titanium, chrome, or their mixed phases). Combination layers made from carbon and ceramic layers are also conceivable.

The hard material layer should have a Vickers hardness HV of at least 800 HV, preferably the Vickers hardness should be at least 1500 HV. The hardness of the second running surface on the bearing ring is lower, as described, it should be a maximum 700 HV. Preferably, the first running surface, that is, the hard material layer, has at least twice up to three-times the hardness of the allocated surface layer or running surface of the bearing ring.

The shaft-side or sleeve-side hard material layer is preferably applied on a substrate with an edge hardness of at least 50 HRC. The thickness of the hard material layer is preferably less than 20 µm, preferably it is in the range between 1-10 µm, and especially in the range between 2.5-4 µm.

A hard diamond like coating, like the material that is known by the trade name "Triondur®" from the applicant, e.g., "Triondur® CX+" has proven to be especially suitable.

BRIEF DESCRIPTION OF THE DRAWINGS

Additional advantages and details of the invention are given from the embodiments described below and with reference to the drawings. Shown are.

DETAILED DESCRIPTION

Figure 1:
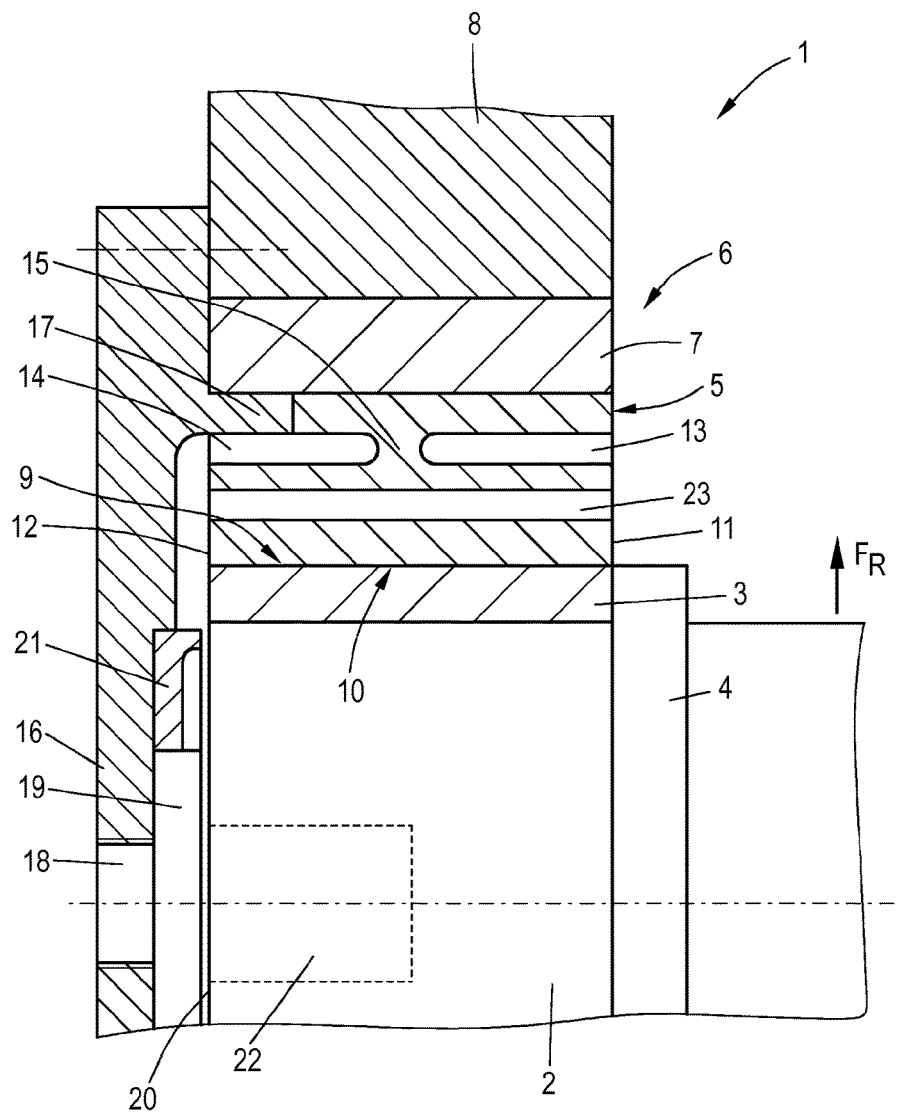
FIG. 1 a basic diagram as a partial view of a bearing arrangement according to the invention, in section, FIG. 2 a side view of a sleeve provided with a radial groove in a first embodiment, FIG. 3 a side view of a second embodiment provided with a radial groove, FIG. 4 an end view of the shaft with sleeve arranged thereon for illustrating the position of the radial grooves, FIG. 5 a basic diagram in partial view of a bearing arrangement according to the invention of a second embodiment, and FIG. 6 an end view of the shaft of the bearing arrangement from FIG. 5.

FIG. 1 shows a plain bearing arrangement 1 comprising a shaft 2 that is loaded with a circumferential radial force $F_R$ as shown by the arrow. The shaft 2 is provided with a sleeve 3 that contacts a stop collar 4 of the shaft 2 in the shown example. The sleeve 3 is connected rigidly to the shaft 2 with a non-positive-locking, positive-locking, or material-bonding connection, thus, they rotate together. The sleeve 3 is one part of the plain bearing; the other part of the plain bearing is a bearing ring 5 that is held rigidly in a housing component 6, here realized in the form of an adapter 7 that is arranged in a housing wall 8. The bearing ring 5 has a first running surface 9 on the inner circumference; the sleeve 3 has, on its outer circumference, a second running surface 10 by which the shaft 2 or the sleeve 3 is supported so it can slide on the first running surface 9.

The sleeve 3 can be provided with a wear-resistant hard material coating that forms the running surface 10. This hard material coating can be, for example, a DLC layer (DLC=diamond like carbon), optionally also doped with metal (Me-DLC layer doped, e.g., with tungsten carbide (WC)). Alternatively, a ceramic layer or a ceramic-like layer can also be provided for forming the running surface 10. Each layer is preferably deposited in a PVD method. Accordingly, the bearing ring 5 or the running surface 9 is the wear component, i.e., the running surface 9 is softer than the running surface 10. Because the radial load $F_R$ is circumferential, the running surface 9 is consequently loaded uniformly circumferentially and consequently wears uniformly in the case of mixed friction.

Because the circumferential radial load $F_R$ leads to shaft deflection, even though slight, it is useful to provide the bearing ring 5 with elasticity, i.e., so that this follows the slight shaft deformation entered via the sleeve 3. For this purpose, on the end sides 11, 12 of the bearing ring 5 there are two circumferential axial grooves 13, 14 that are recessed in the respective end surface. Between them there remains a connecting bar 15 of defined width. The axial grooves 13, 14 enable a slight deflection of the bearing ring 5, in order to follow the shaft deformation. The width of an axial groove naturally depends on the width of the bearing ring. The groove width is typically in the range of a few millimeters, e.g., 2-8 mm; it is dimensioned according to the bearing ring design and application case. A similar arrangement applies for the axial groove depth. The remaining connecting bar should still have sufficient width in each case, for example, at least 5-15 mm, according to the corresponding axial length of the bearing ring 5. Naturally, the position of the connecting bar is also variable, i.e., this does not have to be essentially central, as shown in FIG. 1. Instead, it could also be positioned offset to the right or left bearing ring edge, resulting in a correspondingly different axial groove depth.

It is essential to supply lubricant to the plain bearing, formed from the sleeve 3 and bearing ring 5, that is, the bearing gap produced between the running surfaces 9 and 10. For this purpose, a corresponding device is provided for the lubricant supply comprising a cover 16 that is mounted on the housing wall 8 by threaded connections or the like. It engages with an annular connecting ridge 17 under the adapter 7; the bearing ring 5 is supported axially against the annular connecting ridge 17.

The cover 16 has, in the illustrated example, a central opening 18 on which, for example, a lubricant feed line is connected. By use of the opening 18, lubricant, typically oil, is fed into the gap 19 that forms between the inside of the cover 16 and the end face 20 of the shaft 2 or the corresponding end faces of the sleeve 3 and the bearing ring 5. This gap 19 is used as a lubricant collection space. Between the end face 20 and cover 16 there is also an axial thrust washer 21 that is spaced slightly apart from the end face 20, so that the lubricant reaches into the area of the bearing ring 5. The thrust washer 21 can also have openings for enabling a flow of lubricant.

To be able to transport the lubricant into the bearing gap, that is, the gap between the running surfaces 9 and 10, the sleeve 3 is provided in the area of its running surface 10 with preferably two grooves 22 that extend axially and are designated below as "radial grooves 22," wherein a radial groove 22 is shown in FIG. 1 with dashed lines. The two radial grooves 22 that are formed in the shown example opposite each other on the outer circumference of the sleeve 3 and are consequently positioned +/-90° relative to the radial load $F_R$ are open on their end opening into the end surface 20, but closed on the opposite end. In other words, the lubricant present in the gap 19 can enter into the radial groove 22 from its end-face side. The radial grooves 22 form quasi circumferential lubricant reservoirs, i.e., the lubricant located in them is carried along via the rotating sleeve 3 and is consequently discharged into the bearing gap between the running surfaces 9 and 10. Any special rotational feedthrough or other connection interface, etc., for feeding the lubricant to the shaft 20 is not required here, because the radial grooves 22 are automatically filled with the lubricant under pressure in the gap 19 and it quasi bails itself due to the rotation. The lubricant sticks to the stationary bearing ring or its running surface; it is pulled into the bearing gap due to the shaft rotation or the sleeve motion.

The lubricant discharged from the bearing gap between the running surfaces 9 and 10 is led on one side, namely the side facing the cover 16, into the gap 19 again; therefore, it is collected in the gap 19 again and thus can be held and used again by the radial grooves 22. In other words, the lubricant volume flow can be reduced overall.

On the bearing ring side, at least one oil discharge hole 23 can also be provided, which passes axially through the bearing ring 5. This oil discharge hole, however, is optional; it does not have to be provided.

Figure 2:
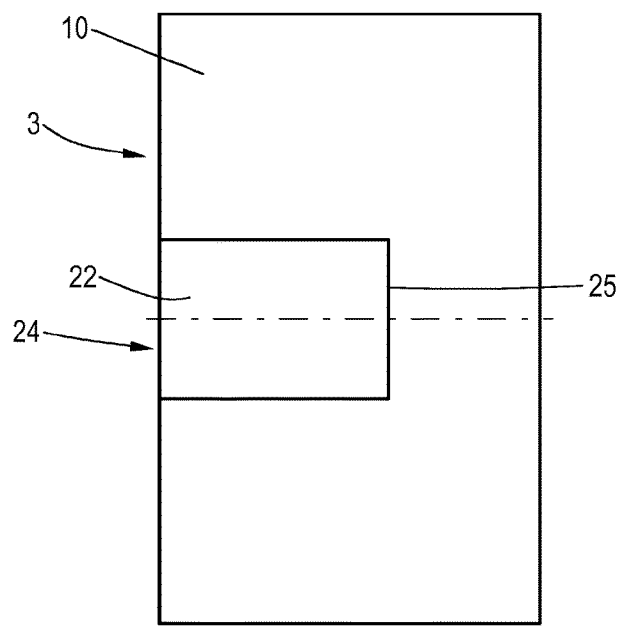

FIG. 2 shows a top view of the sleeve 3 and its running surface 10. Shown is the one radial groove 22 with its end 24 open toward the end face 20 and the closed end 25 on the other side. The radial groove 22 should extend, viewed axially, over at least half, preferably beyond, the second running surface 10. It is not limited to the rectangular configuration shown in FIG. 2. Instead, it can increase or decrease in its width toward the end 25, and also the depth of the radial groove 22 can increase or decrease toward the end 25.

Figure 3:
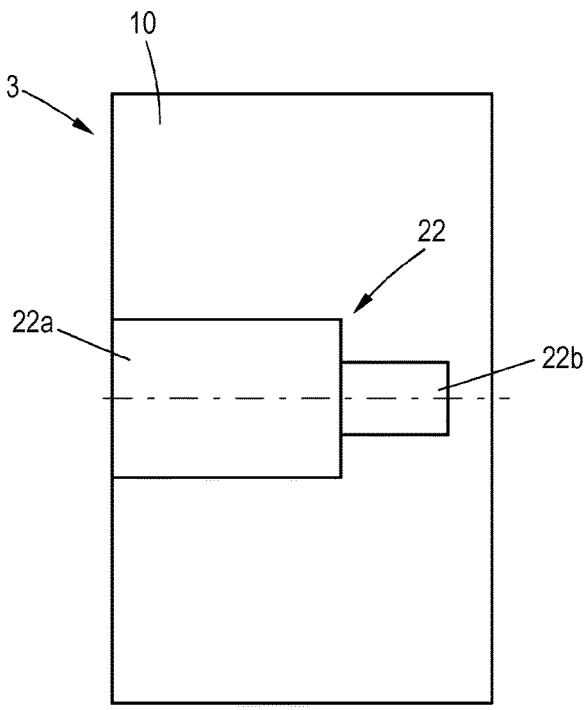

FIG. 3 shows an alternative embodiment of the sleeve 3. The view largely corresponds to that from FIG. 2. The radial groove 22 here has two groove sections, namely the groove section 22a and the groove section 22b. The groove section 22a is clearly significantly wider in the circumferential direction than the groove section 22b; it is also longer viewed in the axial direction. Both groove sections 22a, 22b can have the same depth, but it is also conceivable that the groove section 22b is flatter or deeper than the groove section 22a. Obviously, however, the entire radial groove 22 extends significantly farther than in the embodiment according to FIG. 2 viewed in the axial direction.

Figure 4:
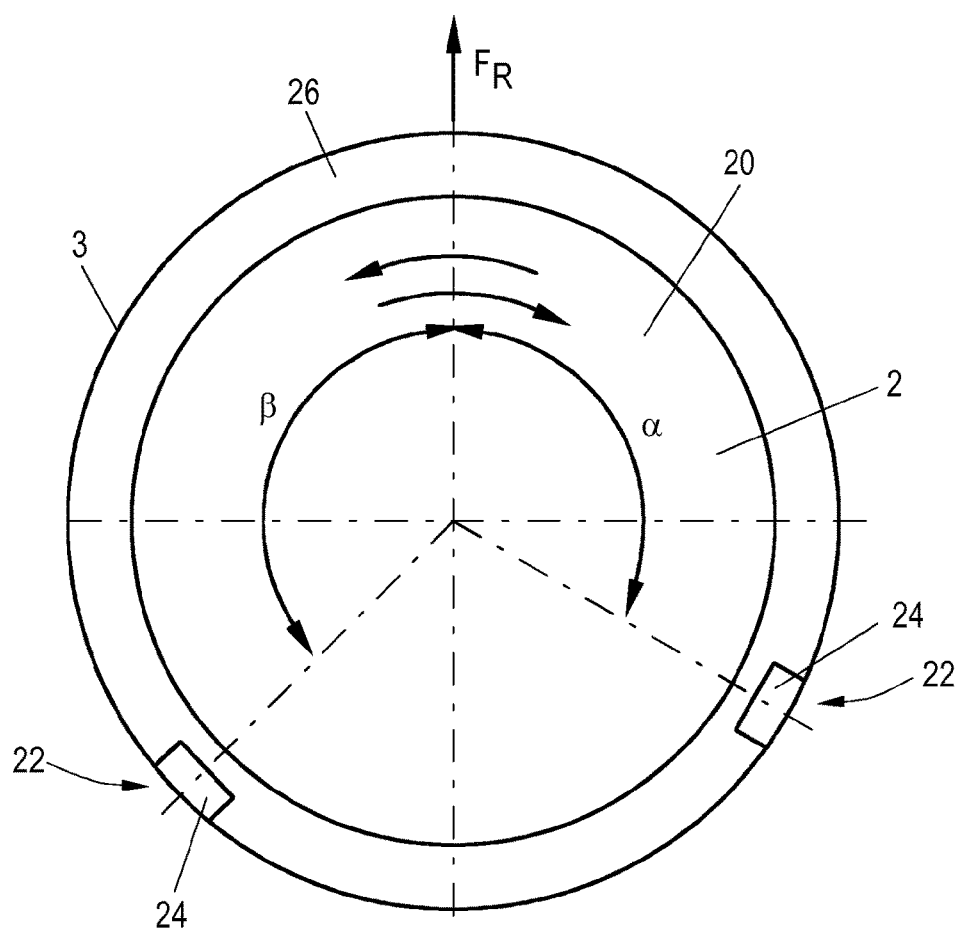

FIG. 4 shows, in an end view, the end face 20 of the shaft 3 and the end face 26 of the sleeve 5. The two radial grooves 22, each with its open end 24, are shown on the sleeve 5. The two radial grooves 22 are arranged offset circumferentially relative to the radial load $F_R$ in the shown example. Here, they are not opposite each other and offset by +/-90° relative to the radial load $F_R$ as described with respect to FIG. 1, but instead by a larger angular increment shown by the two angles α and β. In the shown example, the angles α and β are different, but obviously they could also be equal. The angular interval in which the two radial grooves 22 should be positioned preferably equals 45°-150° in the other respective direction. This has the result that, in the respective rotational direction that is shown by the respective arrow in FIG. 4, a radial groove 22 is positioned in advance of the radial force $F_R$ and the other is positioned following the radial force.

Figure 5:
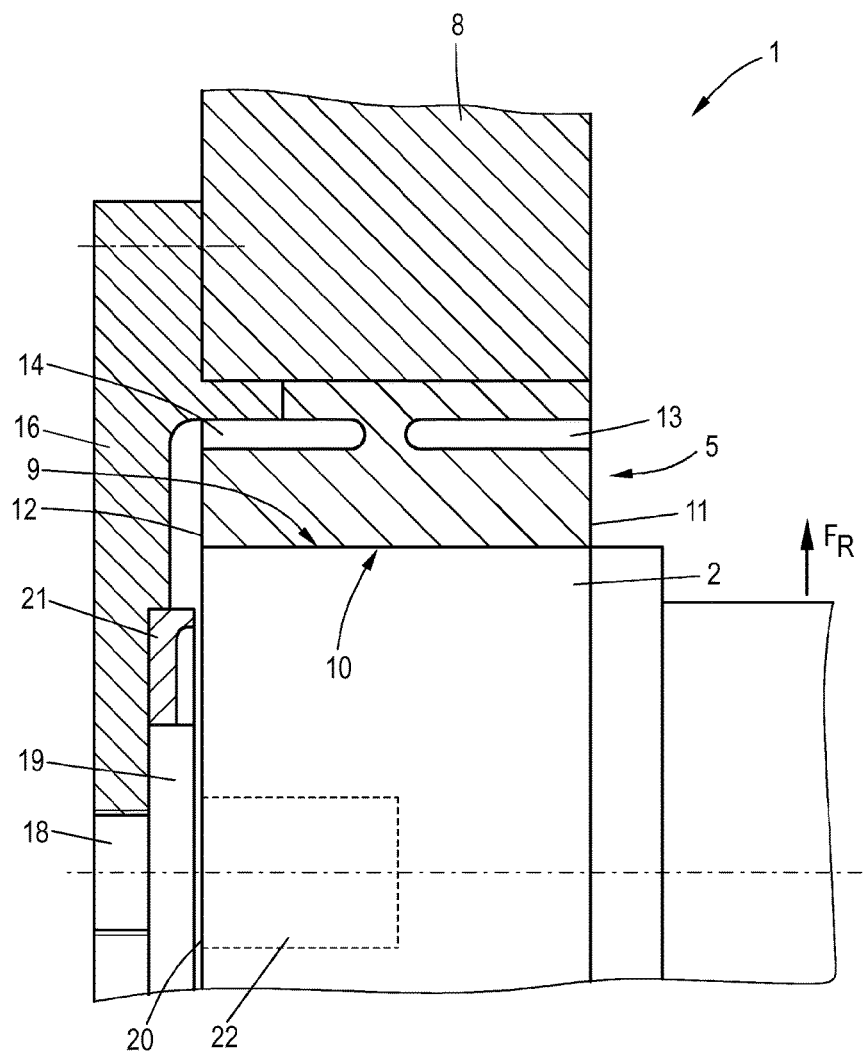

FIG. 5 shows an embodiment according to the invention of a plain bearing arrangement 1 in which the shaft 2 is supported directly in the bearing ring 5. The bearing ring 5 has, in turn, the running surface 9, but the running surface 10 is formed in this embodiment directly on the shaft 2, i.e., in this case, the shaft 2 is overlaid with a hard material coating. In terms of production, this is more complicated than the coating of the sleeve 3 with the hard material layer, but is equally possible. In this case, the radial grooves 22 are formed directly on the shaft 2 and incorporated into the second running surface 10. The geometry of the radial grooves 22 can be, in turn, arbitrary, as already described with respect to the previous embodiment.

Otherwise, the basic configuration of the plain bearing arrangement largely corresponds to that of the embodiment from FIG. 1. The bearing ring 5 is held, in this example, fixed in position directly in the housing wall; an adapter 7 is not provided here. The bearing ring 5 also has an elasticity in which the corresponding axial grooves 13 and 14 are provided on both end faces, wherein elasticity could also be realized—and this also applies to the embodiment according to FIG. 1—only by an axial groove.

The device for feeding lubricant comprising the cover 16 that corresponds to the cover 16 from FIG. 1 is again provided. An opening 18 is again provided on the cover 16 by which the lubricant enters into the gap 19 between the cover and end face 20 of the shaft 2 or the end face 12 of the bearing ring 5. The lubricant is again held and circulated via the radial grooves 22, so that it reaches into the bearing gap between the running surfaces 9 and 10.

Figure 6:
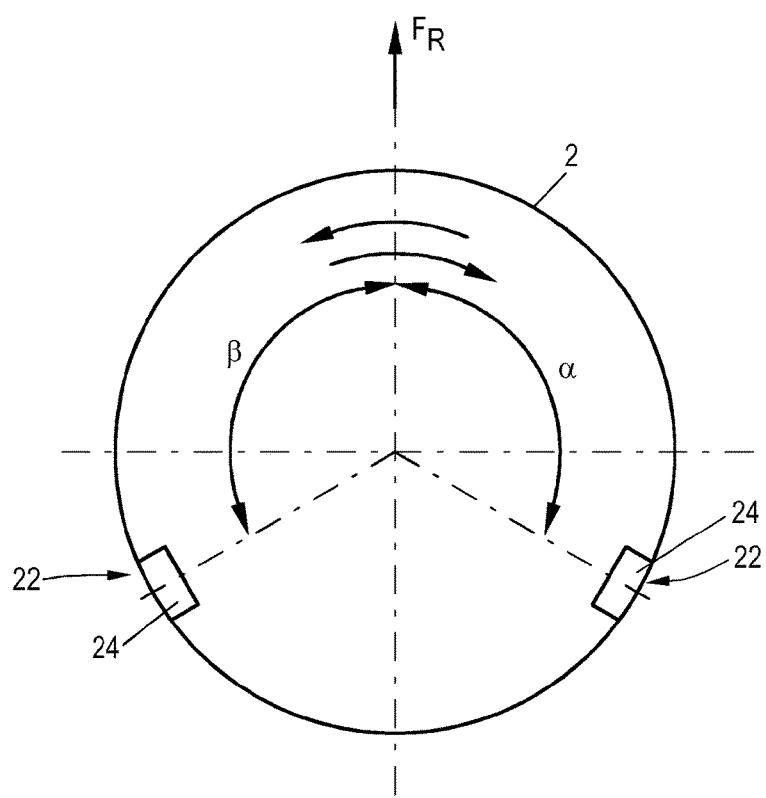

Here, as shown in FIG. 5, the radial grooves 22 can also be arranged offset relative to each other by 180° and consequently can be positioned +/−90° relative to the radial load $F_R$. Alternatively, a different angle offset is also conceivable here, as shown in FIG. 6. The two angles α and β are also shown there as examples and can be, in turn, equal or different.

LIST OF REFERENCE NUMBERS

1 Plain bearing arrangement
2 Shaft
3 Sleeve
4 Stop collar
5 Bearing ring
6 Housing component
7 Adapter
8 Housing wall
9 Running surface
10 Running surface
11 End side
12 End side
13 Axial groove
14 Axial groove
15 Connecting bar
16 Cover
17 Annular connecting ridge
18 Opening
19 Gap
20 End face
21 Thrust washer
22 Radial groove
22a Groove section
22b Groove section
23 Oil discharge hole
24 End
25 End
26 End face

The invention claimed is:

1. A plain bearing arrangement for a shaft loaded with a circumferential radial force, comprising a bearing ring arranged locked in rotation in a housing component with a first running surface constructed on an inner circumference and a second running surface formed on an outer circumference of the shaft or on an outer circumference of a sleeve arranged on the shaft, wherein said second running surface is supported so that it slides on the first running surface, a device is provided for axial feeding of lubricant to an end side of the shaft, and at least one axially open, axially extending, radially open groove is formed in a direction of the end side of the shaft in the second running surface, and the groove is axially closed in a direction opposite the end side, wherein:
  (a) a width and a depth of the groove remains equal from an open groove end to a closed groove end, or
  (b) the width of the groove is larger at the open groove end compared to the closed groove end.

2. The plain bearing arrangement according to claim 1, wherein the groove extends, viewed in the axial direction, over at least half the second running surface.

3. The plain bearing arrangement according to claim 1, wherein two grooves arranged offset circumferentially are provided.

4. The plain bearing arrangement according to claim 1, wherein the at least one groove is arranged offset circumferentially relative to the circumferential radial force.

5. The plain bearing arrangement according to claim 4, wherein if there is only one groove, the offset is 45°-180° in the rotational direction starting from a point that the force is applied and, if there are two grooves, the offset is 45°-180° and 210°-315° in the rotational direction starting from the point that the force is applied.

6. The plain bearing arrangement according to claim 1, wherein the device for axial lubricant feed has a cover that is arranged on the housing side and overlaps the end side of the shaft and at least one opening allowing lubricant to pass to the shaft and positioned adjacent to the end side of the shaft.

7. The plain bearing arrangement according to claim 6, wherein an axial gap extending radially and used for collecting lubricant is formed between the cover and the end side of the shaft and the bearing ring.

8. The plain bearing arrangement according to claim 1, wherein the bearing ring has a circumferential axial groove on one or both end sides.

9. The plain bearing arrangement according to claim 1, wherein the width and the depth of the groove remains equal from the open groove end to the closed groove end.

10. The plain bearing arrangement according to claim 1, wherein the width of the groove is larger at the open groove end compared to the closed groove end.

* * * * *